United States Patent

[11] 3,628,513

[72] Inventor Albert Grosseau
 Paris, France
[21] Appl. No. 47,795
[22] Filed June 19, 1970
[45] Patented Dec. 21, 1971
[73] Assignee Societe Anonyme Automobiles Citroen
 Paris, France
[32] Priority June 26, 1969
[33] France
[31] 6921519

[54] INTERNAL COMBUSTION ENGINE VALVE GEAR LUBRICATION
 6 Claims, 7 Drawing Figs.
[52] U.S. Cl. ................................................. 123/90.34,
 123/90.36, 123/90.27, 123/90.44, 184/6.9
[51] Int. Cl. ................................................. F01m 9/10,
 F01m 1/08
[50] Field of Search ................................. 123/90.34,
 90.36, 90.33, 90.44, 90.27; 74/519; 184/6, 6.9

[56] References Cited
 UNITED STATES PATENTS
| | | | |
|---|---|---|---|
| 1,864,314 | 6/1932 | Morrill | 123/90.34 X |
| 2,209,480 | 7/1940 | Spencer | 123/90.36 X |
| 2,525,791 | 10/1950 | Good | 123/90.36 |
| 2,562,404 | 7/1951 | Aland | 123/90.34 X |
| 2,563,699 | 8/1951 | Winter, Jr. | 123/90.36 X |
| 3,008,544 | 11/1961 | Krizman | 184/6 |
| 3,116,647 | 1/1964 | Leake | 74/519 |
| 3,314,404 | 4/1967 | Thompson | 123/90.34 X |

FOREIGN PATENTS
| | | | |
|---|---|---|---|
| 549,594 | 11/1922 | France | 123/90 L |
| 611,328 | 7/1926 | France | 123/90 H |
| 223,393 | 10/1924 | Great Britain | 123/90 L |
| 280,982 | 11/1927 | Great Britain | 123/90 H |

*Primary Examiner*—Al Lawrence Smith
*Attorney*—Wenderoth, Lind & Ponack

ABSTRACT: This invention constitutes an improvement in the pressure lubrication of rocker-type valve gears of internal combustion engines, and more particularly in the lubrication of the bearing areas between rocker heels and cams in valve gears comprising at least one overhead camshaft associated with at least one hollow rocker shaft acting as a lubricant supply duct, said rocker shaft being formed with oil-dispensing ports in the form of radial holes coincident with radial holes formed in said rockers themselves in order to form lubricant jets directed towards the working surfaces of said cams in a zone located just upstream of the line of contact between the cams and the corresponding rocker heels.

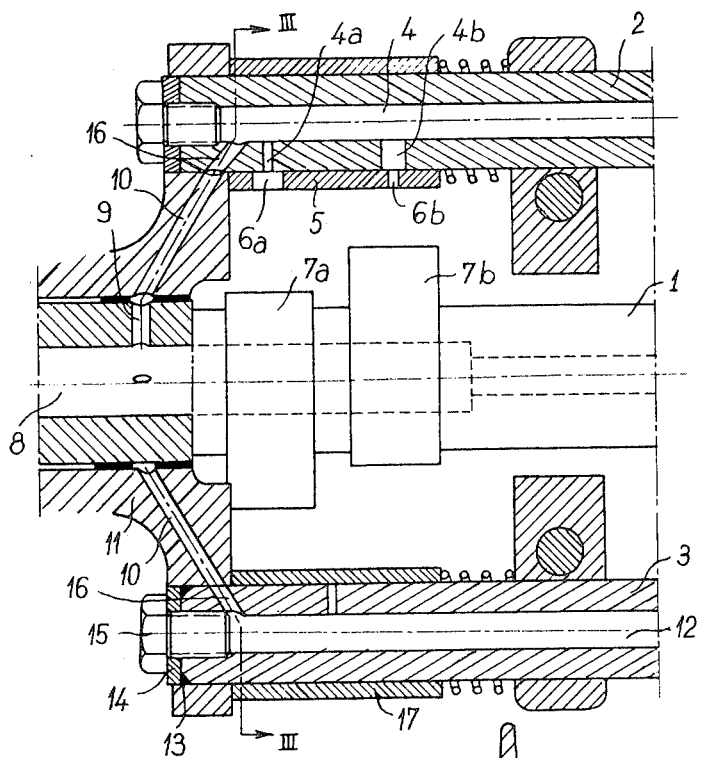
Fig.-2
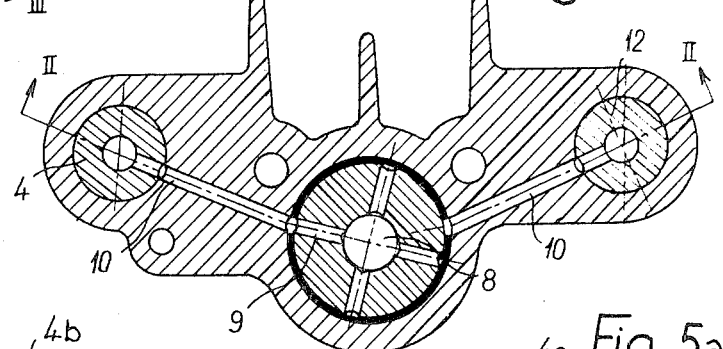
Fig.-3
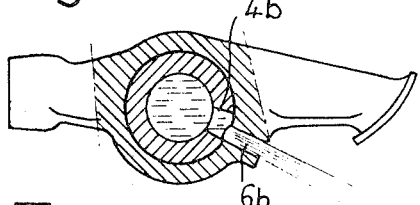
Fig.-4a
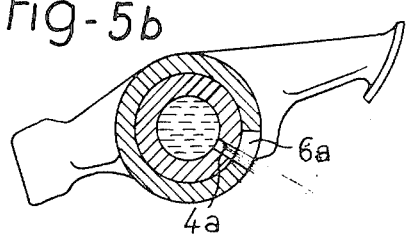
Fig.-5a
Fig.-4b
Fig.-5b
ALBERT GROSSEAU, Inventor
Attorneys

INTERNAL COMBUSTION ENGINE VALVE GEAR LUBRICATION

This invention relates to internal combustion engines and more particularly to internal combustion (or I.C.) engines comprising valves adapted to control the inlet and exhaust of gas to and from the cylinders or combustion chambers.

As a rule, these valves are actuated through valve gears comprising one or move camshafts operating rockers engaging the valve stems.

It is known to arrange the camshaft or camshafts in the cylinder head and to cause the camshaft or camshafts to actuate one or two rows of rockers.

It has already been proposed to lubricate the valve gears by directing the lubricating oil into a hollow shaft and to make use of the rotating or oscillating members mounted thereon (for example rockers) for periodically uncovering ports formed through said shaft in order to deliver a suitable proportion of lubricant projected under pressure against the member to be lubricated.

It is known to lubricate the lines of contact between the cams and the associated rocker heels by directing a jet of lubricant through each cam via a radial hole formed in the hollow camshaft and opening into the working surface of the cam.

Another known proposition consists in lubricating under pressure and continuously or intermittently all the valve gears, notably by using properly directed jets of lubricating oil.

It is the object of the present invention to utilize this method of distributing lubricant for creating an oil film between each cam and the associated rocker heel or cam-engaging rocker shoe, by using a fixed or oscillating jet directed against the working surface of the cam in a zone located just upstream of the line of contact with the rocker, that is, considering the direction of rotation of the camshaft, in the zone which is to engage immediately thereafter the rocker heel or like cam-engaging surface.

This invention is characterized by a periodic pressure oil distribution derived from the lubricating oil supply and independent of the rocker movement; however, it would not constitute a departure from the basic principles of this invention to utilize a continuous oil distribution.

The present invention will now be described more in detail with reference, by way of example only, to a specific form of embodiment illustrated diagrammatically in the attached drawing, in which:

FIG. 2 is a section taken along the broken line II—II of FIG. 3 intersecting the axes of the camshaft and of the rocker alignment;

FIG. 3 is a section taken along the line III—III of FIG. 2;

FIGS. 4a and 4b are fragmentary sections taken across the rocker shafts and the rockers themselves in order to illustrate the variation in the orientation of the lubricant jet according to the rocker position; and FIGS. 5a and 5b are fragmentary sections taken across the rocker shafts in order clearly to illustrate the method o obtaining a lubricant jet having a fixed direction.

Figure 1:
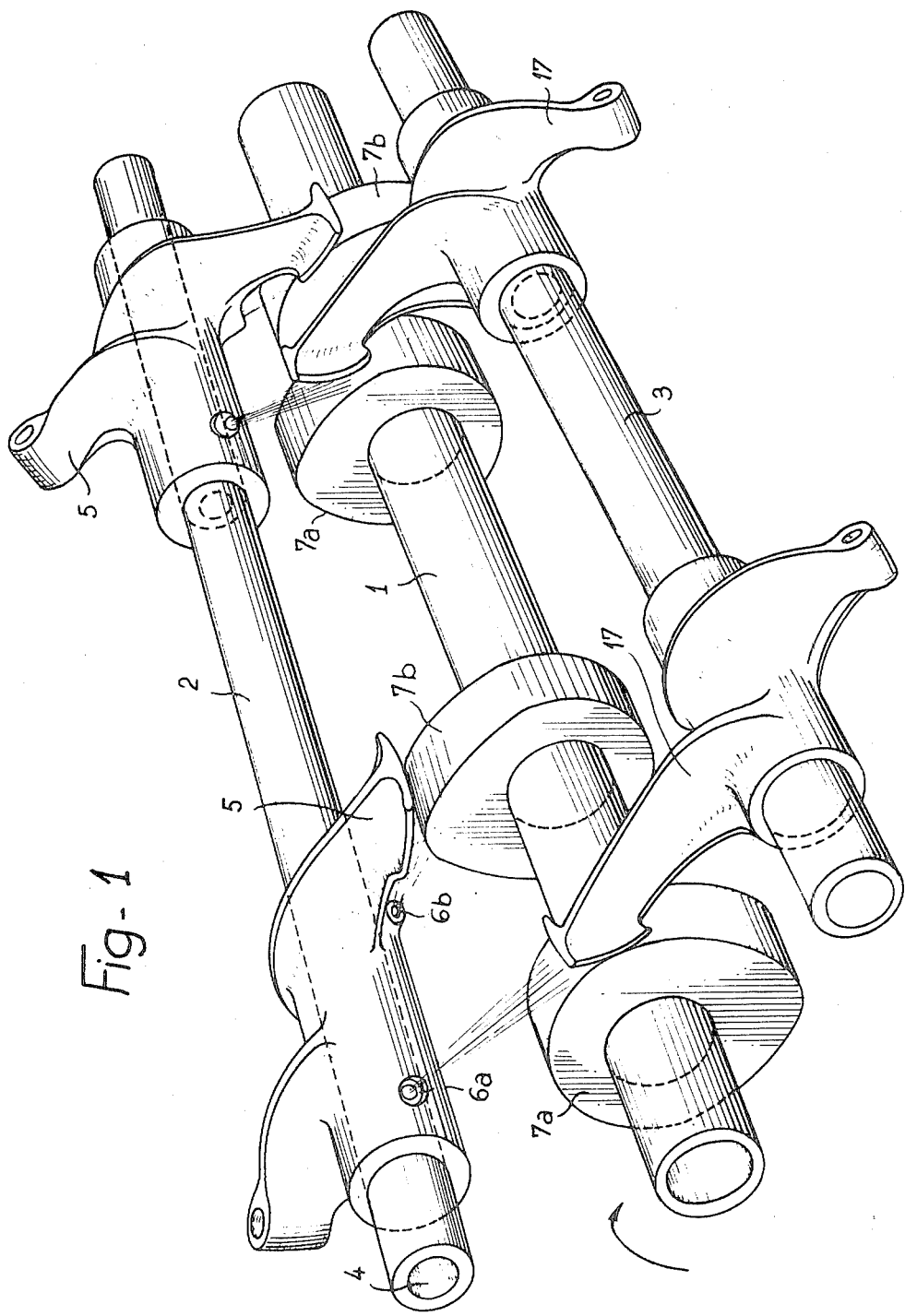
FIG. 1 illustrates in perspective and fragmentary view an assembly comprising a camshaft associated with two rows of rockers, with lubricating means according to this invention.

Reference will firstly be made to FIG. 1 showing in perspective and fragmentary view an assembly comprising a camshaft 1 and two rocker shafts 2 and 3 associated with said camshaft for actuating overhead valves of an internal combustion engine.

Rotatably mounted on shaft 2 are valve rockers 5 actuated by the cams 7b of camshaft 1. Another shaft 3 has likewise mounted thereon other rockers 17 actuated by other cams 7a of camshaft 1.

The shaft 2 is hollow and comprises therefore an axial duct 4; radial holes 4a and 4b are formed through the tubular wall of shaft 2 and register with ports 6a and 6b respectively of the hub portion of a corresponding rocker 5, so that when lubricating oil under pressure is supplied to said duct 4 it is projected towards the working surfaces of cams 7a and 7b, adjacent their zones of contact with the rocker heels or shows.

More particularly as clearly shown in the sections of FIGS. 2 and 3, the lubricant under pressure is fed to a duct 8 at one end of the camshaft and then distributed intermittently via radial passages 9 to corresponding passages 10 formed through the cylinder head 11. Then, the lubricant flows through connecting passages 16 formed through the rocker shafts 2 and 3, and eventually into the axial duct 4 of shaft 2 and duct 12 of shaft 3; however, in this last duct 12 the lubricant is used only for lubricating the rocker bearings.

The necessary oiltightness between the shafts and the cylinder head is obtained by using suitable packing rings 13 disposed between the ends of shafts 2 and 3 and the washers 14 engaged by the screws 15 closing the ends of shaft ducts 4 and 12.

In the arrangement illustrated, the diameter of radial holes 4a is smaller than that of radial holes 6a, and the diameter of radial holes 4b is greater than that of radial holes 6b. As a result, when the rocker 5 is oscillated by the cam 7b and oil jet having a fixed direction emerges from holes 4a and 6a at predetermined times controlled by the momentary alignment of passages 9 and 10, this jet lubricating the registering cam 7a, and another jet of lubricant emerging from holes 4b and 6b oscillating with rocker 5 is directed against cam 7b actuating this rocker, also at predetermined times controlled by the momentary alignment of passages 9 and 10.

These oil jets are so directed that:

1. Cam 7a actuating rocker 17 is sprayed at a point located as nearly as possible to the point of contact between the cam and the rocker heel, considering the direction of rotation of the camshaft, in the cam zone which is about to engage the rocker heel. The direction of this jet is fixed.

2. Cam 7b actuating rocker 5 is sprayed with a view to produce the same action as before but in this case the jet oscillates with the rocker 5.

Under these conditions the device of this invention has the twofold advantage of spraying the working surfaces of the cams with lubricant in a predetermined and known zone located as described hereinabove while avoiding an untimely and undesired centrifugation of the lubricant which might be caused by the camshaft rotation (this detrimental effect being observed notably when the lubricant supplied to the camshaft emerges therefrom at the working surface of the cams).

The amount of lubricant thus dispensed may be limited or controlled by properly locating and timing the supply thereof.

Although the present invention has been described with reference to a specific form of embodiment thereof, it will readily occur to those conversant with the art that various modifications and changes may be brought thereto without departing from the basic principles of the invention as set forth in the appended claims.

What is claimed as new is:

1. Method of lubricating under pressure rocker-type valve gears of internal combustion engines and more particularly the working zones between the rocker heels and the cams in valve gears comprising at least one camshaft associated with at least one hollow rocker shaft mounted in the cylinder head of the engine and adapted to constitute a lubricant feed duct said rocker shaft being provided with lubricant outlets in the form of radial holes registering with radial holes formed in the rockers themselves in order to form lubricant jets, characterized in that these lubricant jets are directed towards the working surface of each cam at a point located just upstream of the line of contact with the rocker shoe.

2. Method according to claim 1, characterized in that the direction of the lubricant jet is related to the oscillating movement of the rocker.

3. Method according to claim 1, characterized in that the jet orientation is independent of the oscillating movement of the rocker.

4. Method according to claim 1, characterized in that said lubricant jet is constant.

5. Method according to claim 1, characterized in that said lubricant jet is delivered periodically with a timing depending on the camshaft rotation.

6. A device for lubricating the bearing zones between rocker heels and cams in the overhead valve gears of internal combustion engines, which comprises at least one camshaft associated with at least one hollow rocker shaft utilized as a lubricant supply duct, said hollow rocker shaft comprising ports consisting of radial holes coincident with other radial holes formed in the rockers themselves in order to form lubricant jets from the supply of oil under pressure directed through the engine camshaft, characterized in that the axial duct of the rocker shaft and the radial holes of the rockers themselves are so directed that their orientations are coincident in a predetermined angular position such as to direct a lubricant jet issuing therefrom towards the working surfaces of said cams, the lubricant jets impinging against said surfaces in a zone located just upstream of the line of contact between the cam and the rocker heel.

* * * * *